United States Patent [19]

Krolak

[11] Patent Number: 5,270,702
[45] Date of Patent: Dec. 14, 1993

[54] BATTERY DOOR FOR A SELECTIVE CALL RECEIVER

[75] Inventor: Leo V. Krolak, Plantation, Fla.

[73] Assignee: Motorola, Inc., Schaumburg, Ill.

[21] Appl. No.: 926,364

[22] Filed: Aug. 10, 1992

Related U.S. Application Data

[63] Continuation of Ser. No. 533,202, Jun. 4, 1990, abandoned.

[51] Int. Cl.$^5$ .................. H04B 1/08; H01M 2/10
[52] U.S. Cl. ................... 340/825.44; 455/347; 429/100
[58] Field of Search ............ 340/825.44, 311.1; 220/264, 331, 335, 346; 455/347, 348; 429/96, 97, 98, 99, 100; 361/392, 394, 422; 354/288; 292/302

[56] References Cited

U.S. PATENT DOCUMENTS

| | | | |
|---|---|---|---|
| 4,371,594 | 2/1983 | Ohara et al. | 429/97 |
| 4,391,883 | 7/1983 | Williamson et al. | 429/100 |
| 4,518,961 | 5/1985 | Davis et al. | 340/825.44 |
| 4,690,878 | 9/1987 | Nakamura | 429/97 |
| 4,755,816 | 7/1988 | DeLuca | 340/825.44 |
| 4,880,712 | 11/1989 | Gordecki | 429/97 |
| 4,965,141 | 10/1990 | Suzuki | 429/100 |
| 4,972,508 | 11/1990 | King | 455/347 |

FOREIGN PATENT DOCUMENTS 6398372  10/1989  Japan ................. 455/347

OTHER PUBLICATIONS

Owner's Manual, Fuji DL-7, Apr. 5, 1989.

Primary Examiner—Donald J. Yusko
Assistant Examiner—J. E. Giust
Attorney, Agent, or Firm—Keith A. Chanroo; Thomas G. Berry; Daniel R. Collopy

[57] ABSTRACT

A selective call receiver (100) comprises a battery powered receiver (104) for receiving and presenting a message, a battery having terminals for electrical coupling thereto, and a housing (208) enclosing the receiver (104) and the battery. The housing (208) has a first opening (206) for receiving the battery and at least one second opening (234) separate from the first opening (206) for securing a battery door (FIG. 4). The battery door (FIG. 4) provides access to the battery contained within the housing (208). The battery door (FIG. 4) comprises a hinged member (214) having a first end (238) coupled to the housing (208) for rotating between a closed position and an opened position, and a second end reduced to form a tongue (240). The hinged member (214) further includes a bottom surface (246) having an electrical contact (244) coupled thereto for electrically coupling the receiver (104) to the terminals of the battery and wherein the hinged member (214) rotates the electrical contact (244) pivotally away from the battery thereby breaking the electrical coupling therebetween. A movable member (212) coupled to and enclosing the hinged member (214) wherein the tongue (240) of the hinged member (214) is slidably coupled within a slot (250) of the movable member (212) for permitting the movable member (212) to slide along the hinged member (214) while the hinged member (214) remains stationary and coupled to the housing (208). The movable member (212) has a first end including at least one protrusion (228) for engaging to the housing (208) and a second end opposite to the first end has at least one strut (254, 256) for engaging with the at least one second opening (234) of the housing (208) for securing the movable member (212).

7 Claims, 3 Drawing Sheets

BATTERY DOOR FOR A SELECTIVE CALL RECEIVER

This is a continuation of application Ser. No. 07/533,202, filed Jun. 4, 1990 now abandoned.

FIELD OF THE INVENTION

This invention relates in general to an improved battery door, and more specifically, to a selective call receiver battery door having both sliding and hinged operation.

BACKGROUND OF THE INVENTION

Battery doors are typically used to contain and provide accessibility to batteries (e.g., removal and replacement of batteries). For example, battery doors and housings for small electronic devices (e.g., selective call receivers) require greater strength to absorb the shocks produced when these devices fall. Similarly, the miniature size of selective call receivers place a significant demand on design strength of miniature battery doors required to contain the battery within the selective call receiver's housing during its normal use.

In small personal electronic devices (e.g., selective call receivers) access to the battery is usually accomplished via a door or cover at one end of the device housing. The battery door may include electronic contacts that transfer the power stored in the battery to one or more electronic circuit(s) contained within the housing of the selective call receiver. The miniaturized sizes of these devices commonly result in battery doors which slide open to permit access to the battery. This type of door is commonly detachable to permit full accessibility to the battery. Regrettably, however, detaching the battery door from the device frequently results in the door being misplaced, lost, or damaged. Also, the sliding battery cover (or door) results in wear to the battery contacts due to friction produced between the battery and the contacts when the door is being removed or replaced.

An alternative to the sliding action is a hinged or pivoted battery door. However, such designs typically include a transverse or rotating locking member to ensure that the battery cover (or door) remains closed during normal operation. Miniaturization of these devices usually result in small latching devices which proves very frustrating to operate by the users.

SUMMARY OF THE INVENTION

A selective call receiver comprises a battery powered receiver means for receiving and presenting a message, a battery having terminals for electrical coupling thereto, and a housing enclosing the receiver means and the battery. The housing has a first opening for receiving the battery and at least one second opening separate from the first opening for securing a battery door. The battery door provides access to the battery contained within the housing. The battery door comprises a hinged member having a first end coupled to the housing for rotating between a closed position and an opened position, and a second end reduced to form a tongue. The hinged member further includes a bottom surface having an electrical contact coupled thereto for electrically coupling the receiver means to the terminals of the battery and wherein the hinged member rotates the electrical contact pivotally away from the battery thereby breaking the electrical coupling therebetween.

A movable member coupled to and enclosing the hinged member wherein the tongue of the hinged member is slidably coupled within a slot of the movable member for permitting the movable member to slide along the hinged member while the hinged member remains stationary and coupled to the housing. The movable member has a first end including at least one protrusion for engaging to the housing and a second end opposite to the first end has at least one strut for engaging with the at least one second opening of the housing for securing the movable member.

A method for securing a battery within a selective call receiver comprises the steps of: a) sliding a movable member coupled to and enclosing a hinged member for engaging and disengaging the movable member with a housing of the selective call receiver, the housing has a first opening for receiving the battery and at least one second opening separate from the first opening for securing a battery door comprising the movable member and the hinged member; b) rotating the hinged member coupled to the housing of the selective call receiver for providing an electrical contact to the battery, the step of rotating rotates the hinged member pivotally away from the battery thereby preventing a slidable movement between the battery and an electrical contact spring coupled to a bottom surface of the hinged member for providing the electrical contact to the battery; (c) engaging a tongue formed at one end of the hinged member to a slot of the moveable member for slidably coupling the movable member to the hinged member to provide a parallel movement of the moveable member along the hinged member; and (d) locking the movable member to the housing wherein the movable member has a first end including at least one protrusion for engaging to the housing and a second end opposite to the first end has at least one strut for engaging with the at least one second opening of the housing for securing the movable member of the battery door and the battery within the housing.

DESCRIPTION OF A PREFERRED EMBODIMENT

Figure 1:
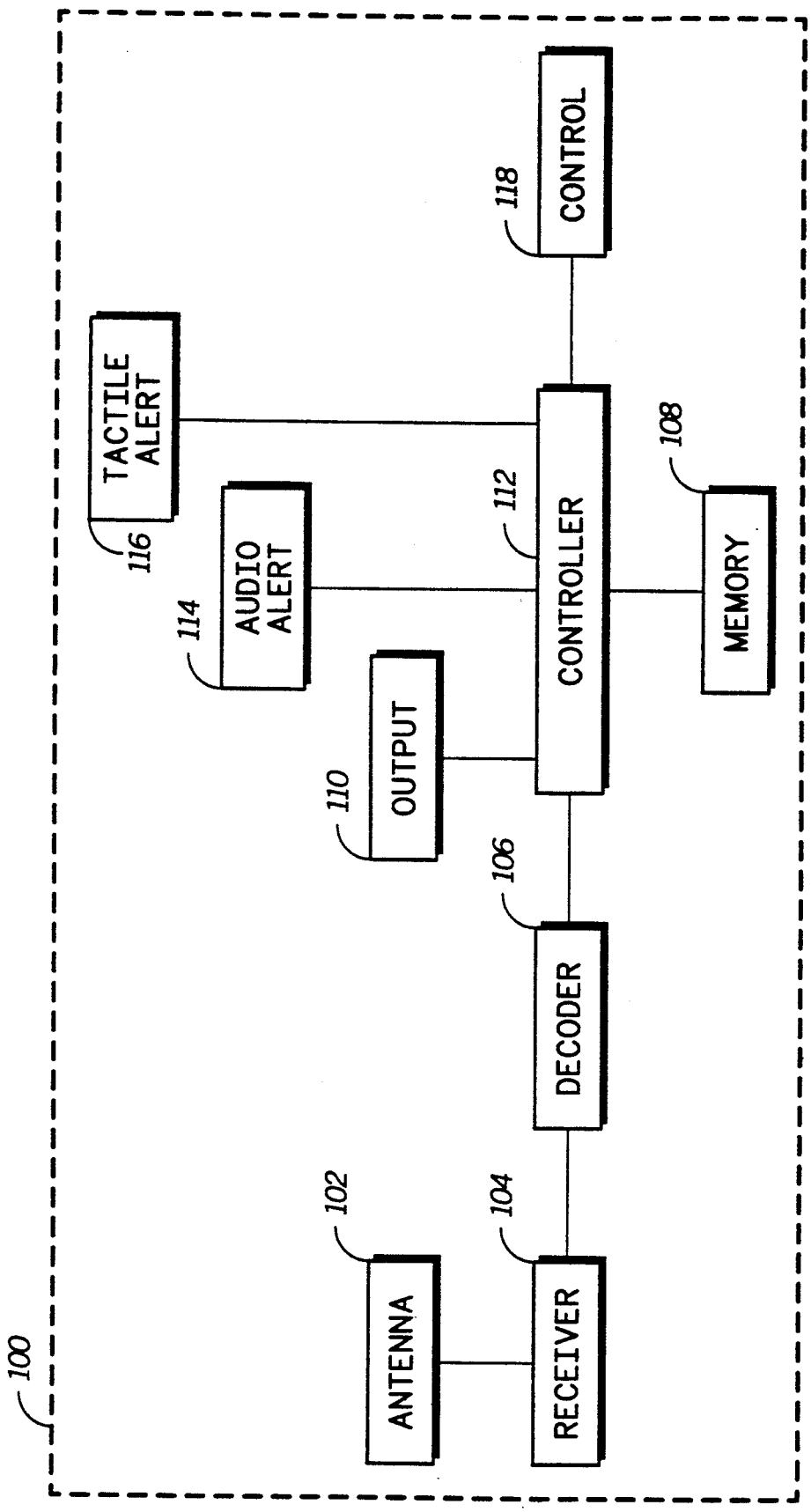
FIG. 1 is a block diagram of the operation of a selective call receiver.

Referring to FIG. 1, a selective call radio receiver 100 (e.g., a pager) comprises an antenna 102 that provides an RF carrier signal that is mixed with a local oscillator signal contained within the receiver module 104. The receiver module 104 generates a recovered signal suitable for processing by a decoder 106 in a manner well known to those skilled in the art. The decoder 106 converts the signal to an address. A controller 112 compares the decoded results with predetermined addresses contained in the memory 108, and when substantially similar, alerts the user that a signal has been received, either by an audio alert (e.g., speaker) 114 or a tactile alert (e.g., vibrator) 116. The received may also include optional message data directed to some selective call receivers, and if the selective call receiver includes an optional voice output, a recovered audio components of the original R.F. signal may be received by the antenna 102. For a message or a voice selective call receiver, the recovered message or voice output is stored in a memory 108 for subsequent "playback" by an output module 110. The output module 110 will automatically, or when manually selected by controls 118, presents the message, such as by displaying the message on a display.

For a more detailed description of the structure and operation of a selective call radio paging receiver of the type shown in FIG. 1, reference is made to U.S. Pat. No. 4,518,961; U.S. Pat. No. 4,880,712; and U.S. Pat. No. 4,755,816; each of which are hereby incorporated by reference.

Figure 2:
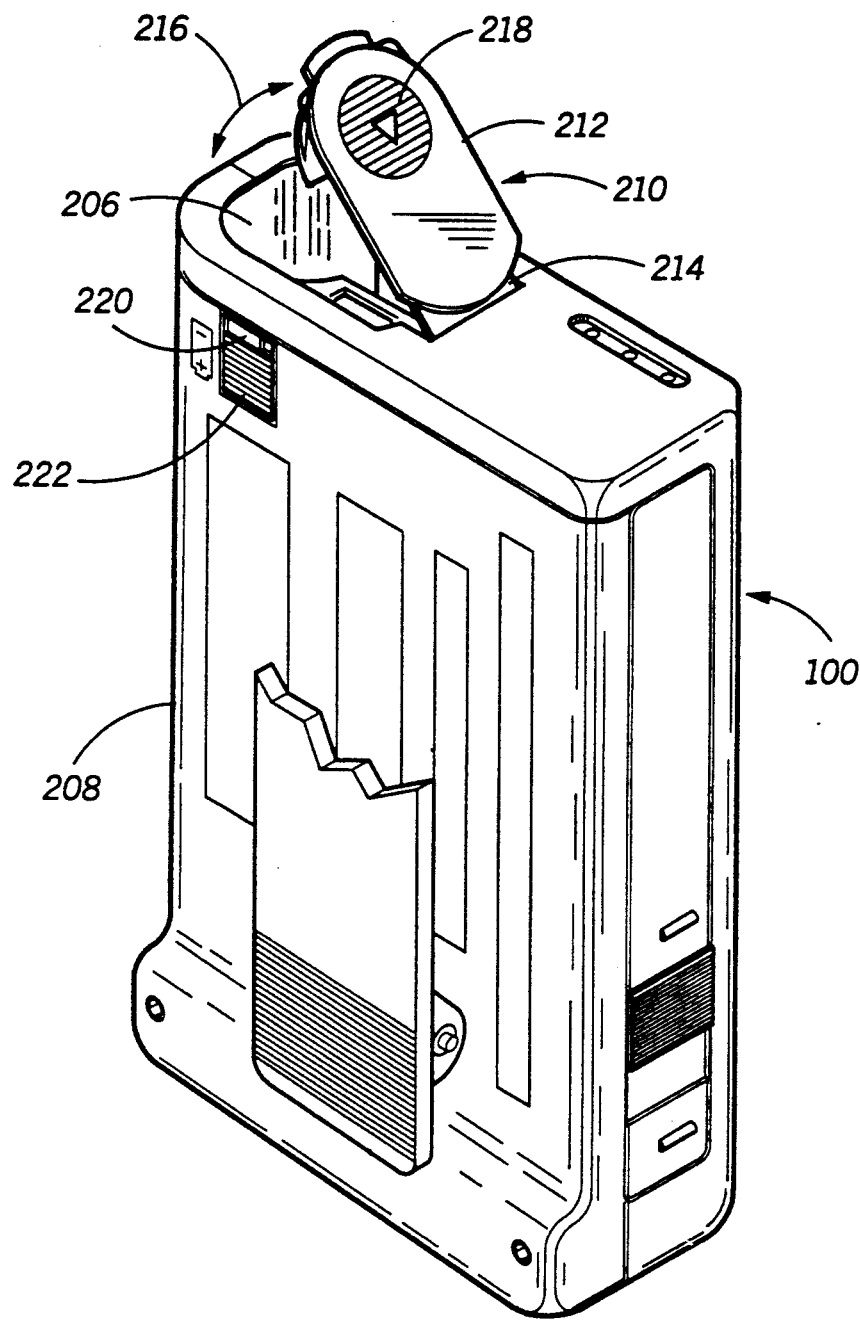
FIG. 2 is a perspective view of a selective call receiver according to the invention.

Referring to FIG. 2, the bottom surface of the selective call receiver 100 having an opening 206 for insertion of a battery (not shown) into the selective call receiver 100. According to the invention the selective call receiver 100 includes a housing 208 for the battery, the housing includes a door 210 for closing off the opening 206 when access to the battery is not required. The door 210 includes a combination of a hinged member 214 and a movable member 212. The movable member 212 slides between a first position for disengaging the door 210 from the housing 208 and a second position for engaging the door 210 to the housing 208. The movable member 212 includes a corrugated area 218 to reduce slippage when it is desired to slide the movable member 212 of the door 210. The door 210 is coupled to the housing 208 and may rotate in the directions shown by the arrow 216 between a first (closed) position where it closes off the opening 206 and a second (open) position where it leaves the opening 206 accessible for insertion and removal of the battery. FIG. 2 also shows a locking member 220 having a corrugated area 222 to allow the lock to be readily engaged and disengaged by the user.

Operationally, sliding and rotating the battery door provides access to the battery contained within the battery housing. After these sequence of actions, the battery door remains attached to the battery housing which is an improvement on the prior art, because the battery door will not be lost or damaged by becoming detached from the battery housing. Additionally, the slanting surface of the protrusions 228 (shown in FIG. 4) imparts a transversal motion on the battery door 210 when the battery is being closed. The user applies only a perpendicular force to close the battery door 210, and the transversal force from the slanting surface of the protrusions 228 drives the the door towards the pivots 236 of the housing 208 without the user having to apply additional force in that direction to close the battery door 210.

Figure 3:
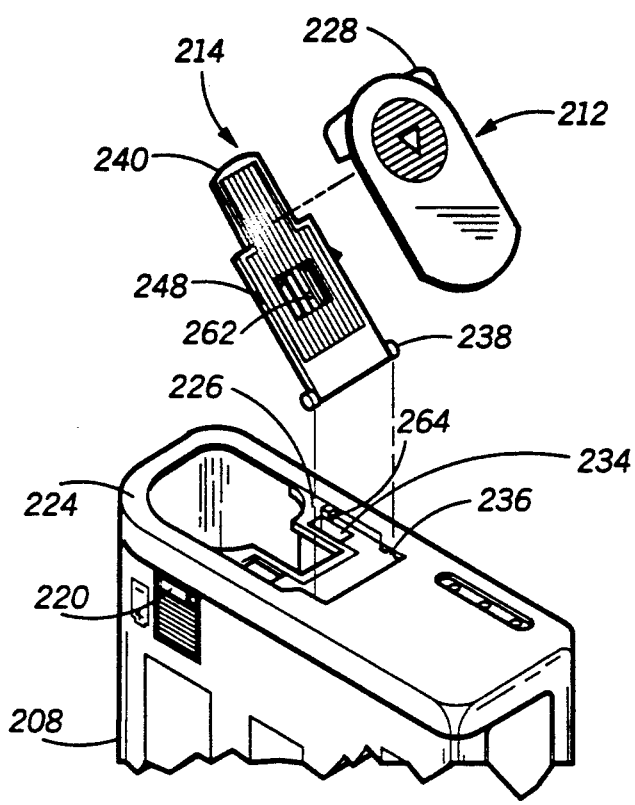
FIG. 3 is an exploded view of the selective call receiver in FIG. 2.

The housing 208, the door 210, and the locking member 220 are further illustrated in FIG. 3. As can be seen, the housing 208 has a rim 224 and base 226. The locking member 220 is constrained to slide within the housing 208, and a right-angled tongue (not shown) provided on the top surface of the member 220 travels within a slot (not shown) formed in the base 226 provided in the opening 206 of the housing 208. When the door 210 is closed and the locking member 220 is in the locked position, the right-angled tongue (not shown) protrudes from the slot in the base 226 and abuts against the edge 258 (shown in FIG. 4) of the movable member 212 of door 210 and prevents it from being moved.

The movable member 212 is provided with protrusions 228 at the front that slides under the rim 224 to secure the door 210 in a closed position. The hinged member 214 of the battery door 210 comprises two semi-circular hinges 238 which are coupled to the housing 208 via circular cavities 236 permitting rotational opening and closing of the door 210. The front of the hinged member 214 is reduced into a tongue 240 which fits into a slot 250 (shown in FIG. 4) in the movable member 212. Also coupled to the hinged member 214 is the battery connector spring 244 (shown in FIG. 4) which maintains a non-movable contact with battery while the movable member 212 engages and disengages the door from the housing.

Figure 4:
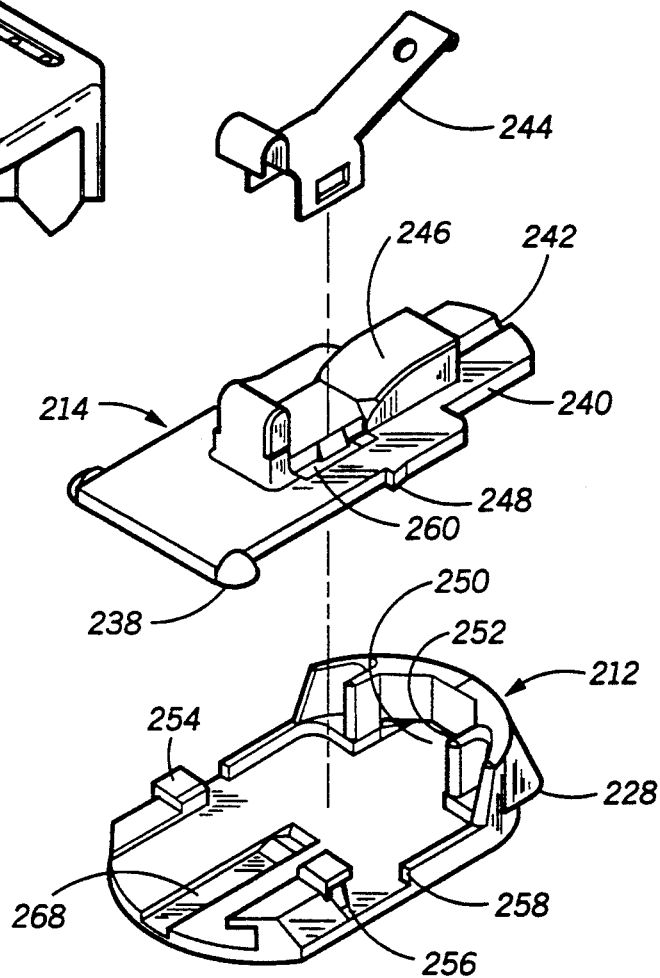
FIG. 4 shows the under surface of the battery door shown in FIG. 3.

According to FIG. 4, the details of the bottom of the movable member 212 and the hinged member 214 of the door 210 are shown. A lip 252 on the bottom edge of the slot 250 meshes with a channel 242 which guides the tongue when the movable member 212 is moved along the hinged member 214. The wedge shaped projections 248 on the hinged member 214 limits the movement of the movable member 212 when it abuts against the strut 254. The struts 254 on the movable member 212 fit into the oblong slots 234 in the base 226 of the housing 208 (shown in FIG. 3). The recesses 256 shown on the struts 254 slides between the grooves created between the base 226 and stops 264 (shown in FIG. 3) to provide support for back of the hinged member 214 taking the strain off the hinged connectors 238 that may be produced from shock. The guide 262 shown on the hinged member 214 (FIG. 3) fits into a track 268 of the movable member 212 to constrain the movement of the movable member 212 with respect to the hinged member 214. Accordingly, the mount 246 shown on the hinged member 214 serves to support the battery connector spring 244 which may be easily removed via slots 260.

In summary, the invention comprises a battery door 210 with a first movable member coupled to second hinged member. The movable member slides between a first position for the disengaging the battery door from the housing and a second position for engaging the battery door to the housing. The hinged member couples to the housing for rotating between a open position for providing access to a battery and a closed position for securing the battery within the housing.

I claim:

1. A selective call receiver comprising:
   a battery powered receiver means for receiving and presenting a message;
   a battery having terminals for electical coupling thereto;
   a housing enclosing the receiver means and the battery, said housing having a first opening for receiving the battery and at least one second opening separate from the first opening for securing a battery door; and
   said battery door providing access to the battery contained within the housing, said battery door comprising:
   a hinged member having a first end coupled to the housing for rotating between a closed position and an opened position and a second end reduced to form a tongue, said hinged member further including a bottom surface having an electrical contact coupled thereto for electrically coupling said receiver means to the terminals of said battery and wherein said hinged member rotates said electrical contact pivotally away from the battery thereby breaking the electrical coupling therebetween; and a movable member coupled to and enclosing said hinged member wherein the tongue of the hinged member is slidably coupled within a slot of said movable member for permitting the movable member to slide along said hinged member while said hinged member remains stationary and coupled to said housing, said movable member having a first end including at least one protrusion for engaging to said housing and a second end opposite to said first end having at least one strut for engaging with the at least one second opening of said housing for securing said movable member.

2. The selective call receiver according to claim 1 wherein the battery door having the hinged member is pivotally coupled to the housing.

3. The selective call receiver according to claim 1 wherein the housing includes a lock for coupling to the movable member for locking the battery door to the housing.

4. A selective call receiver according to claim 1 wherein the hinged member of the battery door maintains a non-movable contact with a battery while the movable member engages and disengages the battery door to and from the housing.

5. The selective call receiver according to claim 1 wherein the movable member moves parallel along the hinged member.

6. A battery door for securing a battery within a selective call receiver comprising:
 a) a hinged member and movable member;
 b) the hinged member having a first end coupled to a housing of the selective call receiver for providing access to a battery within the housing and a second end reduced to form a tongue for coupling slidably with the movable member, said hinged member including a bottom surface having a battery contact spring for electrically coupling to the battery and wherein said hinged member rotates said battery contact spring pivotally away from the battery thereby breaking an electrical coupling therebetween, said housing having a first opening for receiving the battery and at least one second opening separate from the first opening for securing the movable member;
 c) the movable member coupled to and enclosing said hinged member wherein said tongue of said hinged member is slidably coupled within a slot of said movable member for permitting the movable member to slide along said hinged member while said hinged member remains stationary and coupled to the housing, said movable member having a first end including at least one protrusion for engaging to said housing and a second end opposite to said first end having at least one strut for engaging with the at least one second opening of said housing for securing said movable member;
 d) said battery contact spring coupled to the hinged member provides a non-movable electrical contact while permitting the movable member for slidably engaging and disengaging the battery door from the housing.

7. A method for securing a battery within a selective call receiver comprising the steps:
 a) sliding a movable member coupled to and enclosing a hinged member for engaging and disengaging said movable member with a housing of the selective call receiver, said housing having a first opening for receiving the battery and at least one second opening separate from the first opening for securing a battery door comprising the movable member and the hinged member; and
 b) rotating the hinged member coupled to the housing of the selective call receiver for providing an electrical contact to the battery, said step of rotating rotates said hinged member pivotally away from the battery thereby preventing a slidable movement between said battery and an electrical contact spring coupled to a bottom surface of said hinged member for providing the electrical contact to the battery;
 (c) engaging a tongue formed at one end of the hinged member to a slot of the moveable member for slidably coupling the movable member to the hinged member to provide a parallel movement of said moveable member along the hinged member; and
 (d) locking the movable member to the housing wherein said movable member having a first end including at least one protrusion for engaging to said housing and a second end opposite to said first end having at least one strut for engaging with the at least one second opening of said housing for securing said movable member of the battery door and the battery within the housing.

* * * * *